Feb. 1, 1966   E. MEIER ETAL   3,232,387
DISK BRAKE WITH AUTOMATIC WEAR COMPENSATION
Filed Jan. 13, 1964   6 Sheets-Sheet 1

JUAN BELART
HANS SCHANZ
ERNST MEIER
INVENTORS

BY *Mestern, Ross & Mestern*

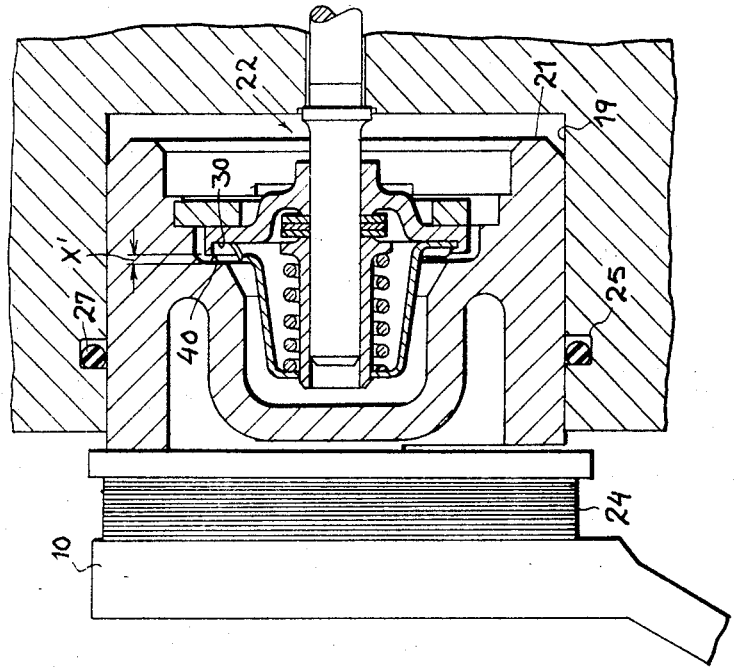
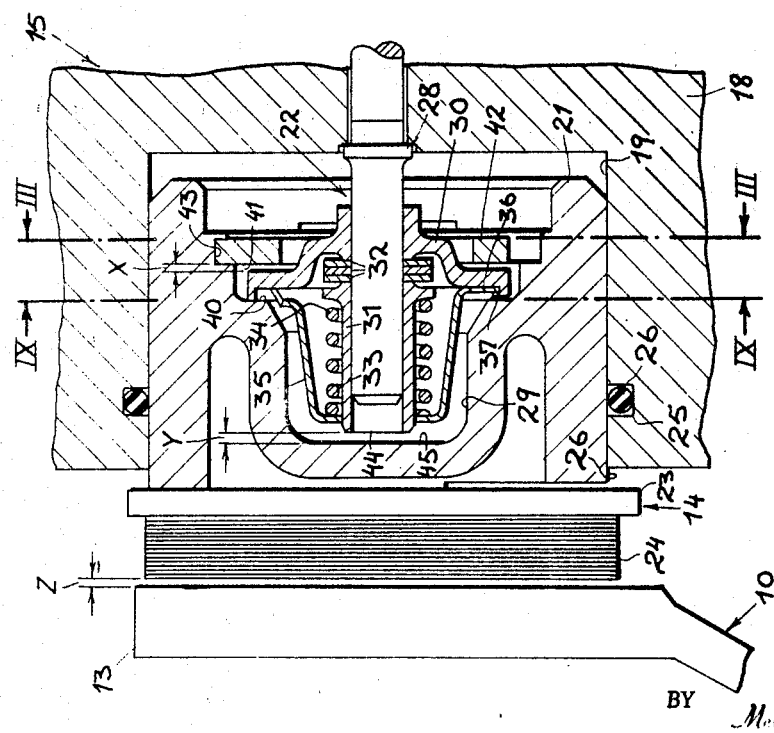

Feb. 1, 1966  E. MEIER ETAL  3,232,387
DISK BRAKE WITH AUTOMATIC WEAR COMPENSATION
Filed Jan. 13, 1964  6 Sheets-Sheet 3

ERNST MEIER
HANS SCHANZ
JUAN BELART
INVENTOR.

BY *Mestern, Ross & Mestern*

ERNST MEIER
HANS SCHANZ
JUAN BELART
INVENTOR.

BY Mestern, Ross & Mestern

JUAN BELART
HANS SCHANZ
ERNST MEIER
INVENTORS.

United States Patent Office 3,232,387
Patented Feb. 1, 1966

3,232,387
DISK BRAKE WITH AUTOMATIC WEAR
COMPENSATION
Ernst Meier, Frankfurt-Sindlingen, Hans Schanz, Niederhochstadt, and Juan Belart, Walldorf, Germany, assignors to Alfred Teves Maschinen- und Armaturenfabrik KG., Frankfurt am Main, Germany, a corporation of Germany
Filed Jan. 13, 1964, Ser. No. 337,684
Claims priority, application Germany, Jan. 11, 1963, T 23,312; Jan. 19, 1963, T 23,360, T 23,361; Jan. 26, 1963, T 23,394
7 Claims. (Cl. 188—72)

Our present invention relates to disk brakes of the type wherein one or more segmental brake shores are displaceable by fluid-responsive means in the direction of a rotatable disk and, more particularly, to disk brakes of this type having means for compensating for the wear of the braking surfaces.

Brake devices have been provided heretofore with automatic compensating means for taking up at least part of the play developed as a consequence of wear of the braking surfaces. Thus it is known to provide a pawl-and-ratchet arrangement for displacing two relatively movable parts of the brake device in order to advance the brake shoes upon wear of the braking surface thereof. In another system, two frictionally interengaging brake parts are relatively displaced by resilient means upon wear of the brake shoe after release of the brake. It is desirable, especially for disk brakes whose disks are subjected to distortion during the braking operation or even in a relaxed condition of the brake, to provide means for compensating for this distortion in addition to the compensating means adapted to adjust the brake shoe for wear of the brake lining. Earlier compensating systems have not been able to respond to such distortion of the brake disk.

It is, therefore, the principal object of the present invention to provide an improved braking device incorporating means for compensating for brake-shoe wear.

Another object of this invention is to provide a compensating system for disk-type brakes wherein the disadvantages of earlier systems can be avoided and which can be constructed with attention to a minimum number of dimensional tolerances.

These objects and others which will become more apparent hereinafter are attained, in accordance with the present invention, which involves a compensating system co-operating with the hydraulic or pneumatic elements of the brake device and essentially comprising a pair of frictionally interconnected members joining the cylinder and piston elements of the fluid-responsive means, one of these elements being provided with lost-motion abutment means engageable after relative movement with respect to the other element for shifting the frictionally interconnected members in such sense as to advance the brake shoe toward the brake disk upon wear of one of the brake surfaces.

We have found that it is also essential that the compensating means be capable of taking up a part or all of the throw or deviation of the disk from its normal plane of rotation. It has been observed that the braking surfaces of the disk of a disk brake tend to deviate from their normal plane of rotation to a small extent during turns and the normal steering movements of the wheels of the automotive vehicle. Thus it may be noted that the wheels and the brake disks associated with them tend to swing substantially about horizontal axes perpendicular to the wheel axle even during small steering movements, this deflection being especially noticeable for the outer wheels with respect to the direction of curvature.

When sharp curvatures are to be negotiated by the vehicle, the extent of this deviation increases markedly and, in conventional brake devices, drives the brake disk against the non-yielding brake shoe and causes distortion of the latter or of the disk. In some systems, the hydraulic or pneumatic systems are sufficiently yieldable so as to permit the brake shoe to withdraw upon throw of the brake disk; in systems of this type, however, the distance or play between brake shoe and disk, upon return of the disk to its original planar position is increased beyond a tolerable level for effective functioning of the brake. It may be noted at this juncture that the throw of the brake disk usually affects only one of the two braking devices generally yoked together at the periphery of the disk. Thus, when the brake devices are mounted in a support yoke above the axle of the wheel, the outboard brake device is affected by deflection of the brake disk during sharp curves as well as the inboard brake device is affected when the two devices are yokes put together below the axle of the disk and wheel.

Throw of the brake disk also arises from thermal deformation as a consequence of the severe heating of the brake disk during the brake operation. In conventional disk brakes using a generally dished brake disk, the periphery of the disk tends to be deformed into a conical condition upon heating during braking. It may be observed that temperatures of 400° C. or higher can easily be reached at the brake disk even when considerable attention is paid to the cooling of the latter by air draft. Heating of the disk in this manner generally results in a conical deformation in which the braking surfaces of the disk bow away from the inboard brake devices and toward the outboard devices. The edge of the disk can be more than 1 mm. out of the plane of normal operation upon heating in this manner.

We have discovered that these difficulties can be minimized when the fluid-responsive devices are able to compensate for throw of the brake disk in this fashion and, upon return of the disk to its original position, restore the brake play. This can be attained, in accordance with the present invention, by providing the frictionally interconnected members with two relatively movable portions adapted to clamp between them the friction means or surface and acted upon by spring means in such manner that during throw of the brake disk the spring means is compressed to constitute force-storing means without shifting one of the frictional members relatively to the other, the spring means then restoring the fluid-responsive elements upon reorientation of the disk. Further stop means can be provided to act directly upon the frictional member whose frictional force cannot be overcome by the spring means when the throw of the disk exceeds a predetermined distance so as to shift the frictional members relatively to one another and permit further yielding of the fluid responsive elements. The abutment means mentioned above, however, is designed so that the frictional member is advanced during application of the brake as soon as the movement of one of the fluid-responsive elements exceeds the brake play necessary to bring the brake shoe into contact with the brake disk.

According to a more specific feature of the present invention, the frictionally interconnected members are received within a recess in the piston member of the device and include a rod rigid with the cylinder member and extending into this recess, the rod being frictionally engaged by a sleeve slidable thereon. The sleeve can constitute one of the relatively movable portions mentioned above and simultaneously be provided with a housing surrounding the spring means which resiliently holds the two portions together. To reduce the number of dimensional tolerances which must be observed in producing the brake device, it is preferable, according to a specific feature of this invention, to form the sleeve member as a capsule-like housing with a sleeve portion disposed axially therewithin and a generally flat cap or disk forming the abutment portion of this frictional member. Alternatively, one portion of the frictional member can be constituted as a disk slidable along the rod while another slidable sleeve portion holds one or more friction means against the disk under the force of a coil spring bearing against a flange of the sleeve portion and a housing shell secured to the base disk. In either case, the shell is advantageously removably mounted upon the base or cap disk by means of a bayonet formation or the like.

According to still another feature of this invention, additional restoring means are provided between the piston and cylinder of the brake device for reestablishing the normal brake play upon release of the brake. This restoring means is preferably a resiliently deformable body frictionally engaging juxtaposed walls of the cylinder and piston and can be constituted as a resiliently deformable O-ring received within a groove on one of the fluid-responsive elements and bearing upon the other. During initial displacement of the two elements, the O-ring will be deformed by frictional interengagement with the two surfaces until the compression force exceeds the friction force, whereupon the surfaces will slide relatively without further deformation of the O-ring. When the brake is released, however, the O-ring decompresses and, since the frictional force is now greater than the compression force, shifts the movable element away from the brake disk by an amount equal to the desirable brake play. The process is then repeated whenever wear of the brake surfaces necessitates a relative movement of the fluid elements beyond the desirable brake play although, under normal conditions, the deformation of the O-ring generally equals the amount corresponding to the desirable play.

The above and other objects, features and advantages of the present invention will become more readily apparent from the following description, reference being made to the accompanying drawing in which:

FIG. 2 is an axial cross-sectional view through one of the brake devices illustrated in FIG. 1, drawn to an enlarged scale;

FIG. 5 is a view of the brake device of FIG. 2 in a position in which the brake has been applied;

Figure 1:
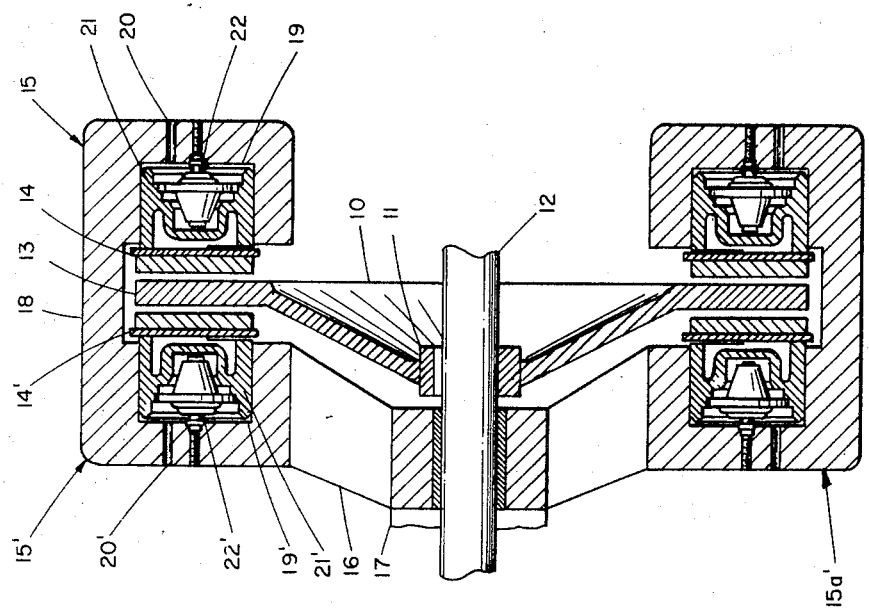
FIG. 1 is an axial cross-sectional view through a disk brake of an automotive vehicle showing alternative positions of the brake devices with respect to the disk axle.

In FIG. 1 there is shown a brake system which comprises a dished disk 10 which is keyed at hub 11 to the axle 12 of the wheel of a motor vehicle not further illustrated. The dished disk 10 has a normally planar marginal portion 13 extending perpendicularly to the axle 12 and bracketed by the brake shoes 14, 14' of a pair of brake devices 15, 15' mounted in a common support means 16 on opposite sides of the disk above the axle 12. The support means 16 includes a sleeve 17 in which the axle 12 of brake disk 10 is journaled, this sleeve being secured to the chassis of the vehicle. The brake system comprises a housing 18 common to the brake devices 15 and 15' and forming the cylinder elements 19, 19' to which fluid is supplied via inlets 20, 20'. Each of the brake devices further comprises a respective piston element 21, 21' and a compensating means 22, 22' which adjusts the distance between the braking faces of the disk 13 and the respective brake shoes to compensate for wear of the latter. It may be noted that, when the brake is provided above the axle 12 of a motor-vehicle wheel, the outboard brake system 15 is most affected by the throw of the brake disk 10 during sharp turns whereas, with similar turns, the inboard system 15a' should be provided with the compensating means when the brake is disposed below the axle 12. The brake structure and compensating means are described in greater detail with respect to FIGS. 2–8.

From FIG. 2, it may be seen that the brake shoe 14 includes a backing plate 23 and a brake lining 24, the latter being maintained a distance $z$ away from the marginal portion 13 of the brake disk 10, the gap $z$ being equal to the normal play of the brake. The cylinder 19 slidably receives the piston 21 and is formed with a circumferential groove 25 juxtaposed with and open in the direction of the sealing face 26 of piston 21. Groove 25 accommodates a O-ring 27 of resiliently compressible and preferably elastomeric material (e.g. rubber) which frictionally engages both the surface 26 and the cylinder wall so that, upon displacement of the piston 21 to the left relatively to the cylinder 19, the O-ring 27 is frictionally entrained by the piston 21 and compressed against the left-hand flank of groove 25. When the displacement of piston 21 is in excess of the usual brake play $z$, the friction force applied by the O-ring 15 is exceeded and the piston 21 slides past the O-ring without compressing it further. When the brake pressure is relaxed, the O-ring decompresses and entrains the piston 21 frictionally to the right to re-establish the brake play $z$.

The compensating means 22 of this brake device comprises a friction rod 28 which extends axially into the cylinder 19 and is rigid with the housing 18 while projecting into a recess 29 in the piston 21. Rod 28 constitutes one of the members of the compensating means whose other member includes a disk-shaped base portion 30 which is slidable on rod 28 and co-operates with a sleeve portion 31, also slidably coaxial with the rod, to entrain a plurality of friction rings 32 interposed between the sleeve portion 31 and the base 30. A coil spring 33 surrounds sleeve portion 31 and is seated against its annular flange 34 while bearing upon a shell 35 surrounding sleeve 31. Shell 35 has outwardly flared formations 36 forming a bayonet connection with the ledges 37 of base 30. This bayonet connection is shown in greater detail in FIG. 4. As will be apparent, the flared formations 36 have angular extents which are less than the angular dimensions of the gaps 38 between the ledges 37 so that a rotation of the shell 35 to remove the formations 36 from beneath the ledges 37 will permit removal of the shell from the base 30.

Figure 3:
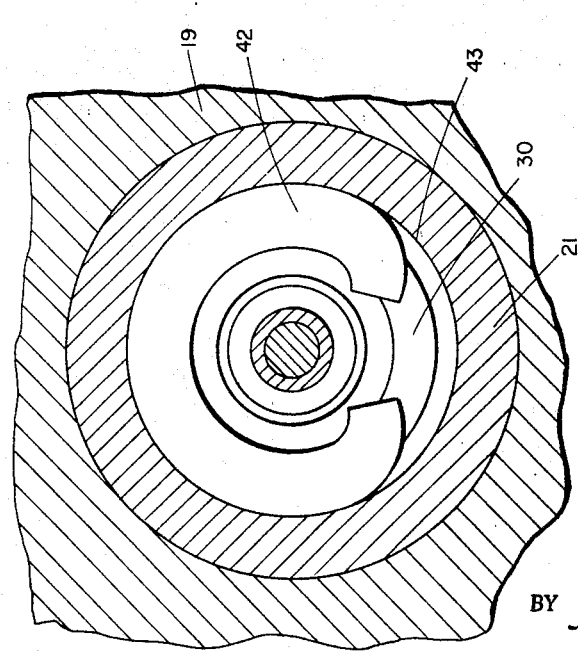
FIG. 3 is a cross-sectional view taken along the lines III—III of FIG. 2.
Figure 7:
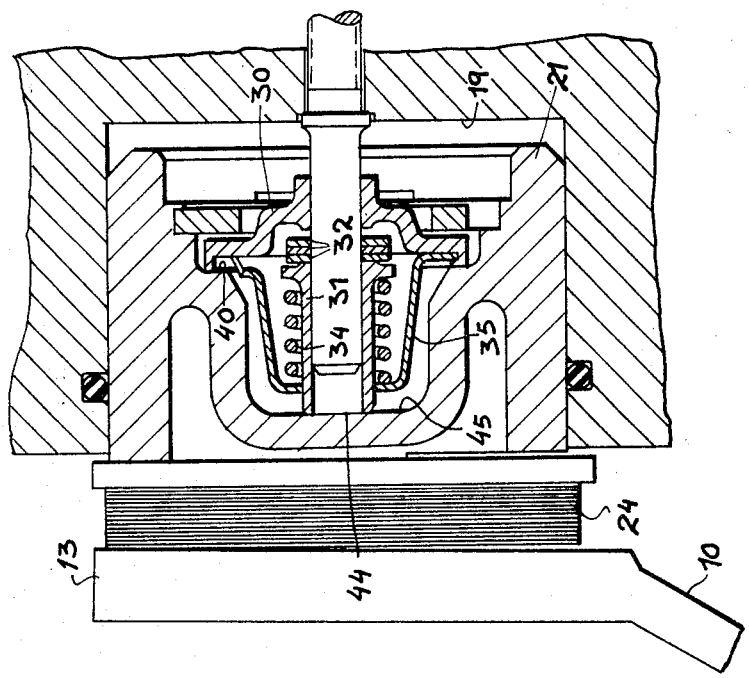
FIG. 7 is a view similar to FIG. 2 showing the brake elements when compensating for a deviation of the brake disk.
Figure 6:
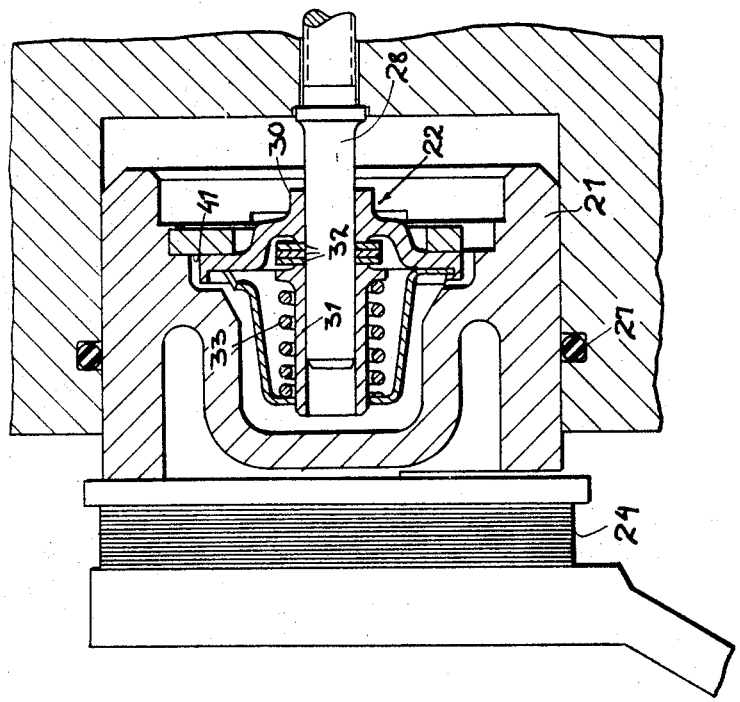
FIG. 6 is a view similar to FIG. 2 showing the position of the brake elements upon wear of the brake shoe.
Figure 8:
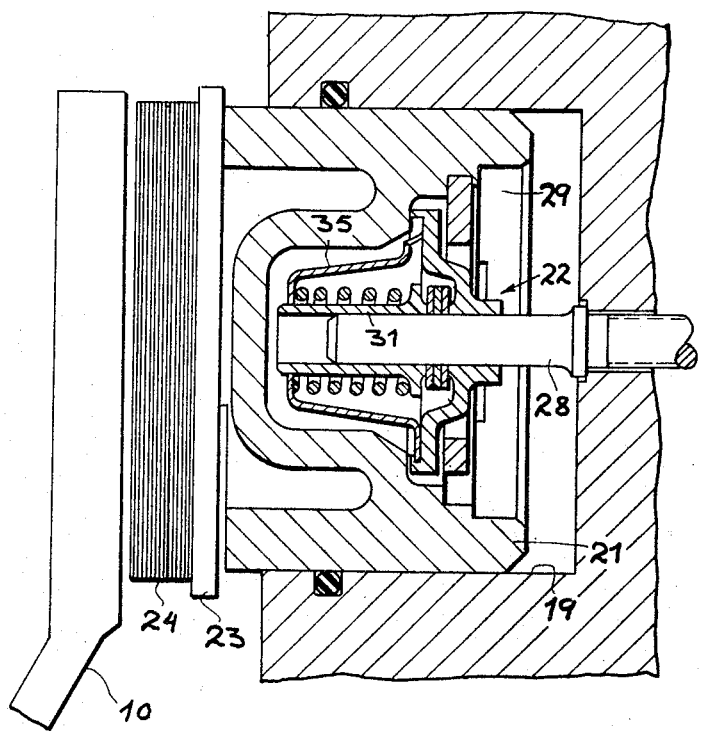
FIG. 8 is a view similar to FIG. 2 illustrating the brake in a released position after considerable wear of the braking surface.

From FIGS. 2 and 3 it will also be apparent that the base member 30 forms a lost-motion connection with abutment means constituted by the axially spaced surfaces 40 and 41 of the piston 21. Abutment surface 41 is constituted by a spring ring 42 which is snapped into a groove 43 formed along the inner wall of recess 29. The spring ring 42 can be removed in the usual manner and may be only loosely held on the piston 21. The lost-motion connection is dimensioned to maintain a play $x$ between surfaces 41 and the base 30 which is equal to or slightly greater than the brake play $z$. The forward end 44 of sleeve 31 constitutes, with the face 45 of piston 21, a stop means which is brought into play when the piston 21 is displaced to the right through a distance y, relative to sleeve 31 and equal to the normal throw of the disk 17 when taken together with the brake play z.

In the unactuated condition of the brake system, when the disk 10 is not subjected to deformation due to thermal effects or vehicle turns, the brake play z is maintained between the brake lining 24 and the juxtaposed face of the marginal portion 13 of the brake disk 10. The lost-motion distance x is provided between the abutment 42 and the base portion 30 of the frictional members constituting the compensating means while a gap y is provided between the stop means 44, 45. When fluid is fed to the cylinder 19, the piston 21 is displaced to the left, thereby taking up the brake play z and bringing the brake lining 24 into braking engagement with the disk 10. During this operation of the brake (FIG. 5) the O-ring 27 is compressed against the left-hand flank of the groove 25 so that, upon release of the brake pressure, the play z is reestablished. The braking movement results in a reduction on the gap x and the establishment of a clearance x' between abutment face 40 and the base 30 of the compensating means 22.

If the brake lining 24 should now wear, the play x will be taken up entirely (FIG. 6) so that the abutment 41 is brought to bear against the base member 30 and the latter is forced to the left along rod 28 to shift the frictional surfaces 32 and the shell 31 to the left therealong. In each of the previously discussed cases, however, spring 33 remains uncompressed or in its original state of compression. When the brake pressure is now relaxed (FIG. 2), the restoring means, i.e. O-ring 27 re-establishes the brake play z while the gap x is also re-established and the entire system is in the state illustrated in FIG. 2 except that the compensating means 22 has been displaced to the left along rod 28 and the rest position of the piston 21 is also further to the left.

When, as a consequence of thermal deflection of the peripheral portion 13 of the brake disk 10, arising from the high temperature produced from prolonged braking or deviation from the normal position of the disk deriving from turns, the braking surface 13 develops a throw (FIG. 7) which brings the disk to bear against the brake shoe 24, the latter is shifted to the right and thus entrains the cylinder 21 in this direction. At the outset, the abutment surface 40 is brought to bear upon the base 30 and shifts the latter to the right, away from the frictional surfaces 32 whose friction force exceeds the resilient force of spring 33. Since the shell 35 against which the spring 33 bears is also entrained by the base 30, spring 33 is compressed and the compensating system is able to accommodate the relatively small throw of the disk arising from thermal distortion and customary turning movements. In some cases, the extent of thermal distortion is so great that the throw of disk 13 exceeds the distance y between the stop means; a similar severe throw arises during sharp turning movements. Under these circumstances, surface 45 of the piston 41 abuts against the stop surface 44 of sleeve 31 and this sleeve is forced together with the frictional surfaces 32 to the right. When the distortion of the disk is removed, spring 33 shifts the base 30 to the left and so brings the piston 21 back into its original position with respect to the disk and the cylinder 19. The distance y is in this case somewhat decreased while the brake play z is slightly increased.

Figure 9:
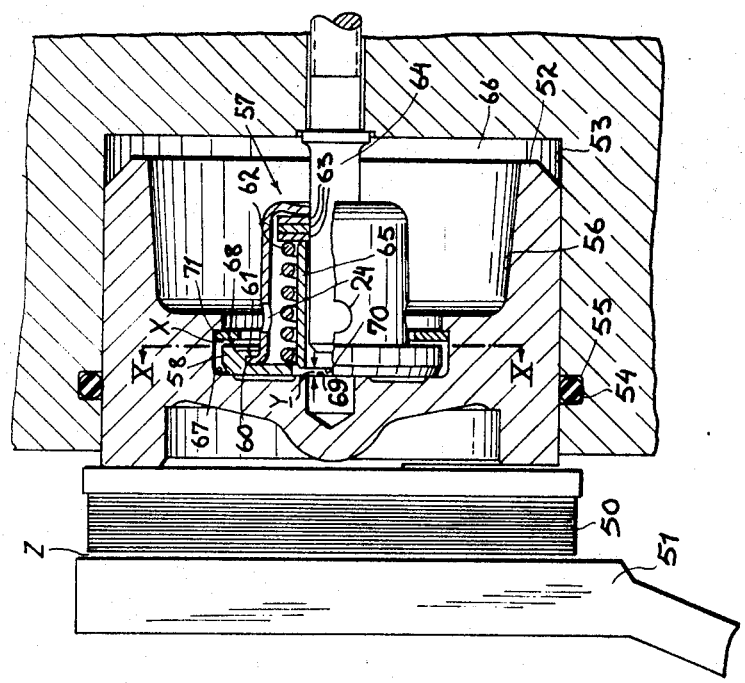
FIG. 9 is a partial axial cross-sectional view generally similar to FIG. 2 but illustrating a modified brake device according to the present invention.
Figure 10:
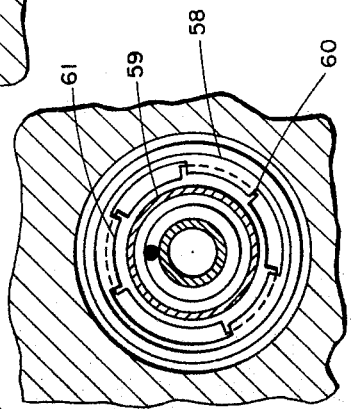
FIG. 10 is a cross-sectional view taken along the lines X—X of FIG. 9.
Figure 4:
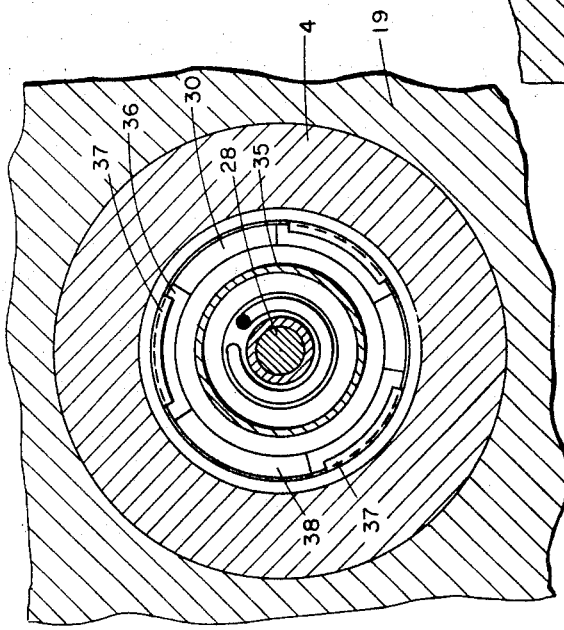
FIG. 4 is a cross-sectional view taken along the lines IV—IV of FIG. 2.

In FIGS. 9 and 10 we show a modified brake system wherein the brake shoe 50 is spaced between distance z from the brake disk 51 and is acted upon by a piston element 52 slidable in cylinder 53 against the restoring force of an O-ring 54 in groove 55 of the cylinder 53. The recess 56 in the piston 52 contains the compensating means 57 which is so constructed as to require minimal attention to dimensional tolerances. Thus the compensating means can include a generally flat and disk-shaped annular plate 58 to which the capsulelike shell 59 is removably secured by a bayonet connection as illustrated in FIG. 10. For this purpose the shell 59 can be provided with outwardly flared formations 60, angularly spaced along the periphery of the shell, which co-operate with angularly spaced ridges 61 of the plate 58. Rotation of the shell 59 with respect to the plate 58 will permit separation of the two portions of the compensating means. Plate 58 forms a seat for the spring 62 which bears against the friction rings 63 constituting the friction surface of the compensating means, these rings being slidable forcibly upon the rod 64. One member of the compensating means is thus constituted by the sleeve 65 surrounding the other member constituted by the rod 64. The shell 59 constitutes the other portion of the frictional member and is provided with apertures 24 to permit the escape of air from within the shell and its removal with the fluid from the pressure chamber 66 formed by cylinder 53. In both of the embodiments previously discussed, the fluid-responsive element can be pneumatically operated although hydraulic pressure is most desirable. The plate 58 forms with the abutment surfaces 67 and 68 of the piston 52 a lost-motion connection in which the gap x is maintained as previously described, another clearance y being provided between the stop surfaces 69 and 70 of the piston 52 and the sleeve 65. The operation of this device is similar to that described with reference to FIGS. 2–8.

Figure 11:
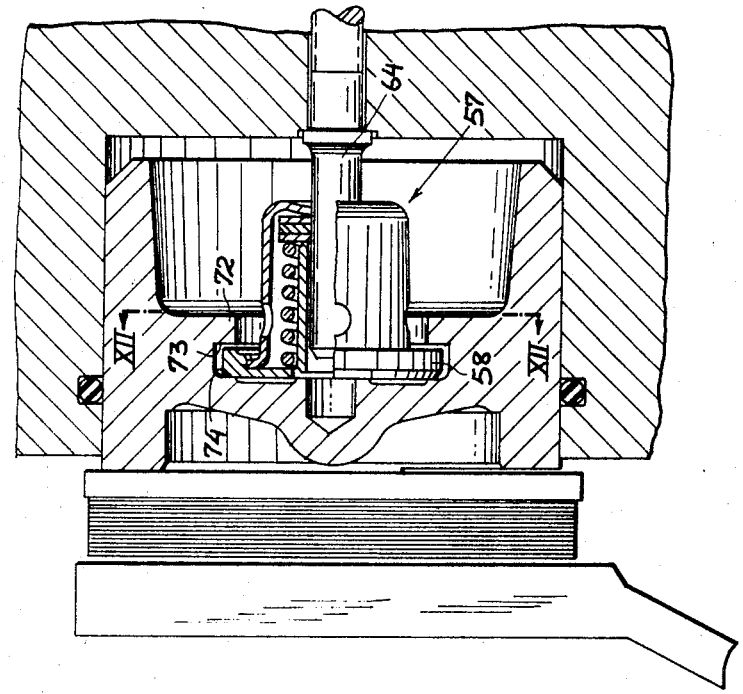
FIG. 11 is a view similar to FIG. 9 showing still another modification.
Figure 12:
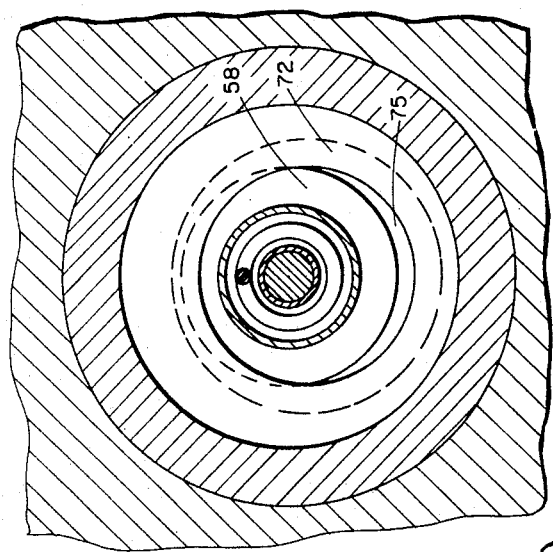
FIG. 12 is a cross-sectional view taken along the lines XII—XII of FIG. 11.

It may be noted, however, that the spring ring 71 forming abutment surface 68 need not be employed and that this abutment surface can be formed by an inwardly directed flange as illustrated, for example, in FIGS. 11 and 12. In this case, the flange 72 has an abutment surface 73 spaced from the other abutment surface 74 and adapted to co-operate with the plate 58 of the compensating means 57. The flange 72 is, however, eccentric with respect to the plate 58 (FIG. 12) so that this plate 58 can be inserted into the aperture 75 axially and then shifted to be off center with respect to this flange, thereby eliminating the need for any additional retaining means. Rod 64 holds the compensating means 57 in its eccentric position with respect to the opening 75. Again, the brake system of FIGS. 11 and 12 operates in a manner similar to that previously described. It may be noted, however, that the construction illustrated in FIGS. 9–12 requires that attention be paid only to three independent longitudinal dimensions, namely the distance between abutment surfaces 67 and 71 or 73 and 74, the thickness of the plate 58, and the length of the shell 59.

The invention described and illustrated is believed to admit of many modifications within the ability of persons skilled in the art, all such modifications being considered within the spirit and scope of the appended claims.

What is claimed is:
1. A disk-brake system comprising support means;
 a brake disk journaled for rotation relatively to said support means;
 at least one brake shoe shiftably mounted in said support means for displacement toward and away from said brake disk and engageable therewith for braking the rotation of said disk relative to said support means;
 fluid-responsive actuating means, including a cylinder element and a piston element reciprocable within said cylinder element, interposed between said brake shoe and said support means for displacing said brake shoe toward and away from said disk;
 compensating means for positioning said brake shoe with respect to said support means, said compensating means including a pair of frictionally interconnectable members bridging said elements, one of said members being secured to one of said elements, the other of said elements being formed with abutment means forming a lost-motion connection with the other of said members for displacing said other of said members relatively to said one of said members in the direction of displacement of said brake shoe toward said disk upon wear of said shoe;

means forming a frictional surface acting upon said one of said members, said other of said members entraining said surface upon displacement in said direction, and spring means resiliently compressible upon engagement of said abutment means with said other member in the opposite direction and bearing upon said other member for resisting displacement of said shoe in said opposite direction; and restoring means bearing resiliently upon said elements for drawing a movable one of said elements away from said disk upon de-energization of said actuating means, said piston member being provided with a recess open in the direction away from said brake disk and constituting said movable one of said elements, said cylinder element being rigid with said support means, said frictionally interconnectable members including a friction rod rigid with said cylinder element and extending in the direction of displacement of said brake shoe into said recess and constituting said one of said members, said other of said members including a sleeve for entraining said frictional surface along said rod, said sleeve being formed with two relatively movable portions offset along said rod and adapted to entrain said frictional surface between them, said spring means surrounding at least one of said portions of said sleeve and drawing said portions together, said compensating means further including a shell surrounding said one of said portions and forming a seat for said spring means extending transversely to said rod, said seat being a generally flat annular plate extending transversely to said rod and said abutment means including a pair of flat surfaces generally parallel to said plate and spaced apart in the direction of displacement of said brake shoe to form said lost-motion connection with said plate.

2. A system as defined in claim 1 wherein said shell constitutes the other of said portions of said sleeve.

3. A system as defined in claim 1 wherein said shell is provided with at least one aperture communicating with said recess and the interior of said cylinder element for discharging air from said shell.

4. A system as defined in claim 1 wherein one of said surfaces of said abutment means is formed by an inwardly directed flange of said piston element in said recess and said recess is excentric with respect to said rod.

5. A system as defined in claim 1, further comprising stop means including said other of said members engageable with said piston element upon displacement thereof in said opposite direction for shifting said surface along said rod while maintaining said spring means in a compressed state, said spring means having a force less than the frictional force of said surface prior to operation of said stop means.

6. A system as defined in claim 1 wherein said shell is removably mounted upon said other member.

7. A system as defined in claim 1 wherein said seat is removably connected to said shell.

References Cited by the Examiner

UNITED STATES PATENTS

| 2,938,609 | 5/1960 | Burnett | 188—73 |
| 3,122,222 | 2/1964 | Burnett et al. | 188—196 |
| 3,134,459 | 5/1964 | Burnett et al. | 188—73 |

FOREIGN PATENTS

| 227,118 | 2/1960 | Australia. |
| 1,306,377 | 9/1962 | France. |

MILTON BUCHLER, *Primary Examiner.*

EUGENE G. BOTZ, ARTHUR L. LA POINT,
*Examiners.*

G. E. A. HALVOSA, *Assistant Examiner.*